Feb. 11, 1936. J. B. STRAUSS 2,030,479
RECORDING MECHANISM
Filed Oct. 23, 1933
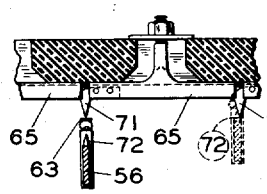
INVENTOR
Joseph B. Strauss
BY
ATTORNEY Patented Feb. 11, 1936

2,030,479

UNITED STATES PATENT OFFICE 2,030,479

RECORDING MECHANISM

Joseph B. Strauss, San Francisco, Calif.

Application October 23, 1933, Serial No. 694,735

3 Claims. (Cl. 101—96)

This invention relates to improvements in a recording device, and has particular reference to a device for use with weighing apparatus.

The principal object of the invention is to produce a device which will set up data to be seen and/or recorded in accordance with the position of the pointer of an indicating instrument such as a pressure gage.

A further object is to provide means whereby the setting up mechanism may be remotely located with respect to the indicating instrument.

Another object is to provide means whereby the data may be taken from the indicating instrument without interfering in any way with the free and normal movement of the pointer until the instant of taking the data.

A still further object is to produce a mechanism wherein the parts do not have to be re-set after each recording.

Other objects and advantages will be apparent during the course of the following description.

In the accompanying drawing forming a part of this specification and in which like numerals are employed to designate like parts throughout the same, Fig. 1 is a side elevation of my device, a portion thereof being shown in cross section, Fig. 2 is a fragmentary cross sectional view of an indicating pointer and the contacts therefor, Fig. 3 is a fragmentary front elevation of Fig. 2, Fig. 4 is an end elevation of Fig. 1, looking from the left of the drawing and having the supporting bearing removed, and Fig. 5 is a fragmentary sectional view on an enlarged scale taken on the line 5—5 of Fig. 2.

It is frequently desirable to automatically collect the readings indicated by the pointer of an instrument which pointer is actuated by delicate forces and therefore construction of these instruments is such that the slightest interference with the free movement of the indicator will result in an incorrect reading. For this reason these indicators are usually very carefully balanced, and their free motion unrestrained except for the microscopic friction of their own bearings. Also, their weight and consequent inertia must be kept at a minimum in order that they will quickly rotate to the proper reading corresponding to the force applied to the instrument, and will become steady at that reading without undue time lost in oscillation. Therefore, any device which is to quickly and accurately collect the data from one of these instruments for the purpose of re-indicating or recording it at a remote point as in the case herein described and claimed, must be so designed that it will not hamper the natural rotation of the pointer either by a sliding contact thereto or otherwise, and also will not materially increase the weight thereof. In my invention, I have accomplished these objectives by the means herein described.

In the accompanying drawing wherein for the purpose of illustration is shown a preferred embodiment of my invention, the numeral 5 designates a frame upon which is mounted a motor 6. This motor drives a shaft 7 at one end of which is a clutch member 8, which is actuated by an electro-magnet 9. Thus clutch 8 carries a stub shaft 11 having a worm 12 which engages a gear 13 rotatably positioned on the frame 5. A spring 14 surrounds the shaft 11 and is so arranged as to normally tend to separate the two sections of the clutch 8. The gear 13 carries a cam 16 which is normally held in a fixed relative position with respect to the gear by a spring 17 and is contacted by a switch lever 15 capable of operating a switch 10. This cam carries a lug 18 which is adapted to contact a push rod 19 pivoted as at 20 to an operating lever 21, pivoted as at 22. A spring 23 normally holds the operating lever in the position of Fig. 1, while a spring 24 tends to hold the push rod 19 in its normal position against the exterior periphery of the cylindrical cam 25 which is fixed to the gear 13. A cam 26 is also secured to the gear 13 and contacts a roller 27 secured to the link 28, which is in turn pivoted to the rocker arm 29, the opposite end of which rocker arm carries a rod 31 having a platen 32, the purpose of which will be later seen. Supported upon the frame 5 is a shaft 33 which carries a series of concentric shafts 34 and 36. The shaft 33 also carries a stop ring 37 and a type drum 38. These are positioned at opposite ends of the shaft. Also freely rotatable on the shaft 33 is a gear 39 which meshes with a gear 41 secured to the shaft 7.

Mounted upon the shaft 34 is a stop ring 42 and a type drum 43. Mounted upon the shaft 36 is a stop ring 44 and a type drum 46. Also mounted upon the shaft 36 is a gear 47, the same being freely rotatable on the shaft. This gear meshes with a gear 48 mounted upon the shaft 7. It will be noted that the stop rings 37, 42 and 44 are each provided with a plurality of spring fingers 49, which press against and make a frictional contact with the sides of the gears 39 or 47, as the case may be. Surrounding each of the stop rings is a latch ring 51. As each of these latch rings are identical, with the exception of the number of latches and solenoids that they carry, but one will be described.

Referring now to Fig. 4, it will be noted that the latch ring 51 has secured to its periphery a plurality of solenoids 52, each of which is capable of operating a latch 53. A spring 54 (see Fig. 1) normally holds the latch in a receded position as indicated in dotted lines at A, Fig. 4, the advanced position being shown at B, Fig. 4, 4. Each of these solenoids is electrically connected to the indicating mechanism.

By now referring to Figs. 2 and 3, I have shown at 56 the pointer of a scale which is mounted upon a slidable shaft 57. A solenoid 58 surrounds the shaft and is capable of moving the said shaft endwise against the tension of a spring 59. This pointer carries a series of contacts 61 and 62 and 63, which are capable of engaging contacts 64, 65 and 66, respectively. The pointer also carries a contact 67 which engages a ring 68 which ring is a common lead for all the circuits established. The contacts 64 are electrically connected to the solenoids 52 of one of the rings 51. The contacts 65 are electrically connected to the solenoids 52 of another of the rings 51 and the contacts 66 are electrically connected to the solenoids of the remaining ring 51, these electrical connections being arranged as follows: the contacts 64 are arranged in groups (see Fig. 3) between the points C and D, serially corresponding contacts in these groups being interconnected by a common lead, each of the common leads in turn being connected to an aforementioned solenoid, and the adjacent contact 65 spans the group as indicated at E. In a like manner the contacts 65 are arranged in electrically interconnected groups, the interconnecting conductors being in turn connected to a solenoid as before mentioned, and the adjacent contact 66 spanning this group. A visual scale is shown at 69.

Referring now to Fig. 5 it will be noted that a sharp point 71 is positioned between each of the contacts 65 and that the pointer 56 has a point 72, the purpose of which is to engage the point 71 when the pointer is moved so that there can be no possibility of the pointer contacts bridging the contacts 65. In other words when the pointer moves toward the contacts, and should be at a point between two of the contacts 65, the engagement of the two point 71 and 72 will force the pointer to one side or the other as indicated in dotted lines of Fig. 5.

To accomplish this I provide 10 latches on the ring 51 to the left of the drawing, 10 latches on the center ring 51, and three latches on the ring 51 to the right of the drawing. The first 10 latches are connected to ten common leads which connect to corresponding contacts 64 in each of the C—D group. The next 10 latches on the center ring are each connected to common leads which in turn connect to certain corresponding contacts 65. The last three latches on the ring 51 to the right of the drawing are electrically connected to the two contacts 66 and to a stop pin (not shown) at the 200 unit point on the dial.

The operation of my device is as follows:

Assuming that a force moves the indicator, the pointer 56 will move to some position and will overlie certain contacts. The operator then presses the operating lever 21, and raises the cam 16 which causes the lever 15 to actuate the switch 10. This conducts the electric current in the main line, to the magnetic clutch 9 to the motor 6 and to the solenoid 58. Immediately the shaft 57 and the pointer 56 are moved so that the contacts 61, 62, 63 engage certain of the contacts 64, 65 and 66 respectively. Immediately the solenoids 52 in each of the rings 51 which are connected to the contacts 64, 65 and 66 which have been contacted by 61, 62 and 63, become energized and displace their respective latches to the position B, Fig. 4 or into alignment with a lug 73 formed upon the stop ring (anyone of the stop rings 44, 42 or 37 may be here referred to). In the meantime the motor 6 has been rotating the gears 39 and 47 which will rotate the shafts 33, 34 and 36 together with their stop rings and the shafts will continue to rotate until the stop rings engage the depressed latches. The gear 13 will continue to rotate and, by this time, cause the cam 26 to actuate the push rod 28, rocker arm 29, rod 31 and platen 32 so as to cause the tapes 74 to be impressed against the indicia formed upon the type drums 38, 43 and 46. It will also be noted here that other cams or gears, or combinations thereof (not shown) may be fixed to the gear 13 and made to perform desired operations such as manipulating the tapes 74. Continued rotation of the wheel 13 will cause the lug 18 on the cam 16 to engage the surface 4 of the push rod 19 and force the latter away from the periphery of the cylindrical cam 25 against the restraint of the spring 24 thus allowing the lug 18 to pass the push rod 19, and the cam 16 to again engage the lever 15, which will break the electrical circuit at the switch 10 and will immediately stop the apparatus.

Having thus described my invention, I claim:—

1. In a device of the character described, a plurality of concentric shafts, a type drum mounted on each of said shafts, means for rotating said shafts, means for stopping the rotation of each of said shafts at pre-determined points, said means comprising a group of radially positioned solenoids for each of said shafts, a latch actuated by each of said solenoids, each of said solenoids being electrically connected to remotely positioned contacts capable of being energized through the engagement of contacts moving into engagement therewith, and a master switch for conducting current to said contacts and to said motor.

2. In a device of the character described, a plurality of concentric shafts, a type drum mounted on each of said shafts, means for rotating said shafts, means for stopping the rotation of each of said shafts at pre-determined points, said means comprising a group of radially positioned solenoids for each of said shafts, a latch actuated by each of said solenoids, each of said solenoids being electrically connected to remotely positioned contacts capable of being energized through the engagement of contacts moving into engagement therewith, and a master switch for conducting current to said contacts and to said motor.

3. In a device of the character described, a recording mechanism, said recording mechanism including a plurality of concentric shafts, a type drum carried by each of said shafts, freely rotatable gears mounted on certain of said shafts, positive means for rotating said gears, friction means carried by each of said shafts and engaging certain of said gears, means for stopping the rotation of said shafts at pre-determined points, said means comprising radially positioned latches, and remote controlled means for actuating said latches.

JOSEPH B. STRAUSS.